US010687380B2

(12) United States Patent
Kim et al.

(10) Patent No.: US 10,687,380 B2
(45) Date of Patent: Jun. 16, 2020

(54) PDN CONNECTION MANAGEMENT METHOD AND NETWORK ENTITY

(71) Applicant: LG ELECTRONICS INC., Seoul (KR)

(72) Inventors: Hyunsook Kim, Seoul (KR); Jinsook Ryu, Seoul (KR); Laeyoung Kim, Seoul (KR); Myungjune Youn, Seoul (KR); Dongsoo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/745,618

(22) PCT Filed: Jun. 20, 2016

(86) PCT No.: PCT/KR2016/006524
§ 371 (c)(1),
(2) Date: Jan. 17, 2018

(87) PCT Pub. No.: WO2017/018663
PCT Pub. Date: Feb. 2, 2017

(65) Prior Publication Data
US 2018/0213587 A1    Jul. 26, 2018

Related U.S. Application Data

(60) Provisional application No. 62/196,306, filed on Jul. 24, 2015, provisional application No. 62/323,694, filed on Apr. 16, 2016.

(51) Int. Cl.
*H04W 76/18* (2018.01)
*H04W 36/16* (2009.01)
(Continued)

(52) U.S. Cl.
CPC ......... *H04W 76/18* (2018.02); *H04L 65/1006* (2013.01); *H04L 69/40* (2013.01);
(Continued)

(58) Field of Classification Search
None
See application file for complete search history.

(56) References Cited

U.S. PATENT DOCUMENTS

| 9,420,554 | B1 | 8/2016 | Patel et al. | |
| 2011/0176407 | A1* | 7/2011 | Campbell | H04W 76/34 370/216 |

(Continued)

FOREIGN PATENT DOCUMENTS

| KR | 10-2014-0001244 A | 1/2014 |
| KR | 10-2014-0055612 A | 5/2014 |

(Continued)

OTHER PUBLICATIONS

"3rd Generation Partnership Project;Technical Specification Group Core Network and Terminals; IMS Restoration Procedures (Release 12)"; 3GPP TS 23.380 V12.0.0 (Sep. 2014).
(Continued)

*Primary Examiner* — Gregory B Sefcheck
*Assistant Examiner* — Suk Jin Kang
(74) *Attorney, Agent, or Firm* — Dentons US LLP

(57) ABSTRACT

A disclosure of the present specification provides a packet data network (PDN) connection management method performed by packet data network gateway (P-GW). The method may comprise the steps of: establishing a first type PDN connection with a user equipment (UE); recognizing that an error has occurred in the first type PDN connection, after establishing the first type-PDN connection; and transmitting a delete bearer request message to a mobility management entity (MME) in order to perform a bearer deactivation procedure according to the recognition of the error occurrence. The delete bearer request message may include information indirectly indicating that an error has occurred in the first type PDN connection.

7 Claims, 14 Drawing Sheets

(51) Int. Cl.

| | | |
|---|---|---|
| *H04W 36/30* | (2009.01) | |
| *H04W 36/36* | (2009.01) | |
| *H04W 40/24* | (2009.01) | |
| *H04L 29/14* | (2006.01) | |
| *H04W 76/19* | (2018.01) | |
| *H04L 29/06* | (2006.01) | |
| *H04W 24/04* | (2009.01) | |
| *H04W 8/08* | (2009.01) | |
| *H04W 36/00* | (2009.01) | |
| *H04W 80/10* | (2009.01) | |
| *H04L 29/12* | (2006.01) | |
| *H04W 76/12* | (2018.01) | |

(52) U.S. Cl.
CPC ............ *H04W 8/08* (2013.01); *H04W 24/04* (2013.01); *H04W 36/0022* (2013.01); *H04W 36/165* (2013.01); *H04W 36/305* (2018.08); *H04W 36/36* (2013.01); *H04W 40/24* (2013.01); *H04W 40/248* (2013.01); *H04W 76/19* (2018.02); *H04W 80/10* (2013.01); H04L 61/2007 (2013.01); H04L 65/1016 (2013.01); H04L 65/1069 (2013.01); H04L 65/1073 (2013.01); H04L 65/80 (2013.01); *H04W 76/12* (2018.02)

(56) References Cited

U.S. PATENT DOCUMENTS

| | | | | |
|---|---|---|---|---|
| 2012/0094629 | A1* | 4/2012 | Liu | H04W 36/06 455/404.1 |
| 2012/0113959 | A1* | 5/2012 | Sugizaki | H04W 36/0016 370/331 |
| 2013/0023265 | A1 | 1/2013 | Swaminathan et al. | |
| 2013/0107888 | A1* | 5/2013 | Guo | H04W 36/0022 370/401 |
| 2013/0242754 | A1* | 9/2013 | Shaikh | H04W 24/04 370/242 |
| 2013/0250750 | A1* | 9/2013 | Nishida | H04W 76/00 370/216 |
| 2013/0286843 | A1* | 10/2013 | Nishida | H04W 76/00 370/235 |
| 2014/0112146 | A1* | 4/2014 | Hu | H04W 28/18 370/235 |
| 2014/0120914 | A1* | 5/2014 | Ohnishi | H04W 60/005 455/435.2 |
| 2015/0003342 | A1 | 1/2015 | Swaminathan et al. | |
| 2015/0063346 | A1* | 3/2015 | Eswara | H04L 65/103 370/352 |
| 2015/0124582 | A1* | 5/2015 | Campbell | H04W 76/34 370/216 |
| 2015/0282012 | A1 | 10/2015 | Baek et al. | |
| 2015/0351136 | A1* | 12/2015 | Kaura | H04W 76/36 370/329 |
| 2016/0113053 | A1* | 4/2016 | Chuang | H04W 76/18 370/329 |
| 2016/0316515 | A1* | 10/2016 | Long | H04L 41/0893 |
| 2016/0323798 | A1* | 11/2016 | Horn | H04W 36/165 |
| 2016/0380802 | A1* | 12/2016 | Kunz | H04L 65/1016 370/216 |
| 2017/0171782 | A1* | 6/2017 | Mohamed | H04W 36/0011 |
| 2018/0092140 | A1* | 3/2018 | Dong | H04W 76/38 |
| 2018/0092148 | A1* | 3/2018 | Kawasaki | H04W 4/00 |
| 2018/0098210 | A1* | 4/2018 | Kawasaki | H04W 28/08 |
| 2018/0098373 | A1* | 4/2018 | Kawasaki | H04W 4/00 |
| 2018/0103502 | A1* | 4/2018 | Kawasaki | H04W 4/00 |
| 2018/0116008 | A1* | 4/2018 | Kawasaki | H04W 36/14 |
| 2018/0124855 | A1* | 5/2018 | Kawasaki | H04W 4/00 |
| 2018/0124862 | A1* | 5/2018 | Kawasaki | H04W 4/00 |
| 2018/0132099 | A1* | 5/2018 | Li | H04W 8/26 |
| 2018/0199188 | A1* | 7/2018 | Kim | H04W 60/04 |
| 2018/0206286 | A1* | 7/2018 | Pragada | H04W 76/25 |
| 2018/0220262 | A1* | 8/2018 | Qu | H04W 4/029 |
| 2018/0220327 | A1* | 8/2018 | Karampatsis | H04W 28/0252 |
| 2018/0332635 | A1* | 11/2018 | Akiyoshi | H04W 88/16 |
| 2018/0352589 | A1* | 12/2018 | Jeong | H04W 80/10 |
| 2019/0123953 | A1* | 4/2019 | Kunz | H04L 65/1016 |

FOREIGN PATENT DOCUMENTS

| | | |
|---|---|---|
| WO | 2011-122808 A2 | 10/2010 |
| WO | 2014-026800 A1 | 2/2014 |
| WO | 2014/084596 A1 | 6/2014 |
| WO | 2015/044664 A1 | 4/2015 |

OTHER PUBLICATIONS

3GPP TS 23.401 V13.3.0, "General Packet Radio Service (GPRS) enhancements for Evolved Universal Terrestrial Radio Access Network (E-UTRAN) access (Release 13)", Jun. 21, 2015, pp. 93-110.

\* cited by examiner

PDN CONNECTION MANAGEMENT METHOD AND NETWORK ENTITY

This application is a 35 USC § 371 National Stage entry of International Application No. PCT/KR2016/006524, filed on Jun. 20, 2016, and claims priority to U.S. Provisional Application No. 62/196,306, filed on Jul. 24, 2015, and U.S. Provisional Application No. 62/323,694, filed on Apr. 16, 2016, all of which are incorporated by reference in their entirety herein.

BACKGROUND OF THE INVENTION

Field of the Invention

The present invention relates to a mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |

TABLE 1-continued

| REFERENCE POINT | DESCRIPTION |
|---|---|
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re)selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

FIG. 5a is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 5b illustrates a connection process in a radio resource control (RRC) layer.

FIG. 5b shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 4b.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

FIG. 6 illustrates connection between an EPC and an IP Multimedia Subsystem (IMS).

The IMS is a network technique that enables not only a wired terminal but also a wireless terminal to perform IP-based packet switching (PS) and is proposed to connect both wired/wireless terminals through the IP (All-IP).

An IMS-based network includes control signaling, registration, and a Call Session Control Function (CSCF) for processing a session procedure. The CSCF may include a Proxy-CSCF (P-CSCF), a Serving-CSCF (S-CSCF), and an Interrogating-CSCF (I-CSCF). The P-CSCF operates as a first access point for a UE in the IMS-based network. The S-CSCF processes a session in the IMS network. That is, the S-SCSF is an entity serving to route a signal and routes a session in the IMS network. The I-CSCF operates as an access point to another entity in the IMS network.

Under the IMS, an IP-based session is controlled by a session initiation protocol (SIP). The SIP is a protocol for controlling a session, which is a signaling protocol that specifies a procedure in which terminals to communicate identify each other to detect locations thereof and generate a multimedia service session therebetween or delete or change a generated session. The SIP uses an SIP Uniform Resource Identifier (URI), similar to an email address, to distinguish each user, thus providing a service without being subjected to an IP address.

Referring to FIG. 6, a first P-GW 53a of the EPC is connected to the P-CSCF 61 of the IMS, and the P-CSCF 61 is connected to the S-CSCF 62.

Further, a second P-GW 53b of the EPC is connected to a network of an Internet service provider.

However, a service is completely interrupted when a failure occurs in a specific network node in the EPC.

Accordingly, a control mechanism has been conventionally proposed to continuously provide a service by changing a path to a normal network node instead of a failed network node when a failure occurs in a specific network node.

However, conventionally, even if a failure occurs in a specific data network, for example, an IPv6 network which provides a VoLTE service, there is no effective mechanism for changing to a data network of a different type capable of providing the VoLTE service, that is, an IPv4 network. In this case, in order to replace the network failure, an operator has to disconnect and reconnect currently accessed terminals, and then re-establish a connection to the data network of the different type. However, when the number of currently accessed terminals is great, there is a problem in that it may take several hours to sequentially reconnect the terminals. In addition, since it takes several hours, there is a problem in that a critical service such as VoLTE provided in a failed data network (e.g., an IPv6 network) is interrupted.

SUMMARY OF THE INVENTION

Accordingly, an object of the present invention is to present a method that can solve the aforementioned problem.

To achieve the above object, a disclosure of the present specification provides a method in which a terminal for performing a mobile oriented (MO) or mobile terminated (MT) VoLTE call is preferentially re-accessed or re-configured when a failure occurs in a specific data network (e.g., a IPv6 network), thereby providing a user with a normal service even slightly quickly.

In detail, to achieve the above object, a disclosure of the present specification provides a method for managing packet data network (PDN) connection. The method may be performed by a packet data network gateway (P-GW) and comprise: establishing a first-type PDN connection with respect to a user equipment (UE); after establishing the first type PDN connection, recognizing that a failure occurs in the first type PDN connection; and transmitting a delete bearer request message to a mobility management entity (MME) to perform a bearer deactivation procedure according to whether the failure occurrence is recognized. Here, the delete bearer request message comprises information indirectly indicating that the failure occurs in the first type PDN connection.

The method may further comprise: determining whether normal data is received or IP multimedia subsystem (IMS) signaling is received from the UE.

The transmitting of the delete bearer request message may be performed when the failure occurrence is recognized but it is determined that the IMS signaling is received from the UE.

The recognizing may be performed based on a configuration changed and set by an operator.

The determining of whether the normal data is received or the IMS signaling is received from the UE may be performed based on whether to use a specific access point name (APN) and whether to use a default bearer having a quality of service class identifier (QCI) of 1.

The method may further comprise: receiving dummy data from a proxy-call session control function (P-CSCF) in IMS, wherein the recognizing is performed based on the dummy data.

The method may further comprise: receiving information indicating that the failure occurs in the first type PDN connection from P-CSCF via a policy and charging rule function (PCRF), wherein the recognizing is performed based on reception of the information.

To achieve the above object, a disclosure of the present specification also provides a management method performed by an entity in charge of a control plane in an evolved packet system (EPS). The method may comprise: receiving information indicating that a failure occurs in a first-type network; upon recognizing the failure occurrence in the first-type network on the basis of the information, transmitting a request message to a PDN-gateway (P-GW) which has established a packet data network (PDN) connection with respect to a user equipment (UE) on the basis of the first-type network; receiving a response message comprising second-type address information from the P-GW; and delivering the second-type address information to the UE.

According to a disclosure of the present specification, the problem of the conventional technique can be solved. In particular, a service interruption time is minimized when a failure occurs in a network.

DESCRIPTION OF EXEMPLARY EMBODIMENTS

Figure 1:
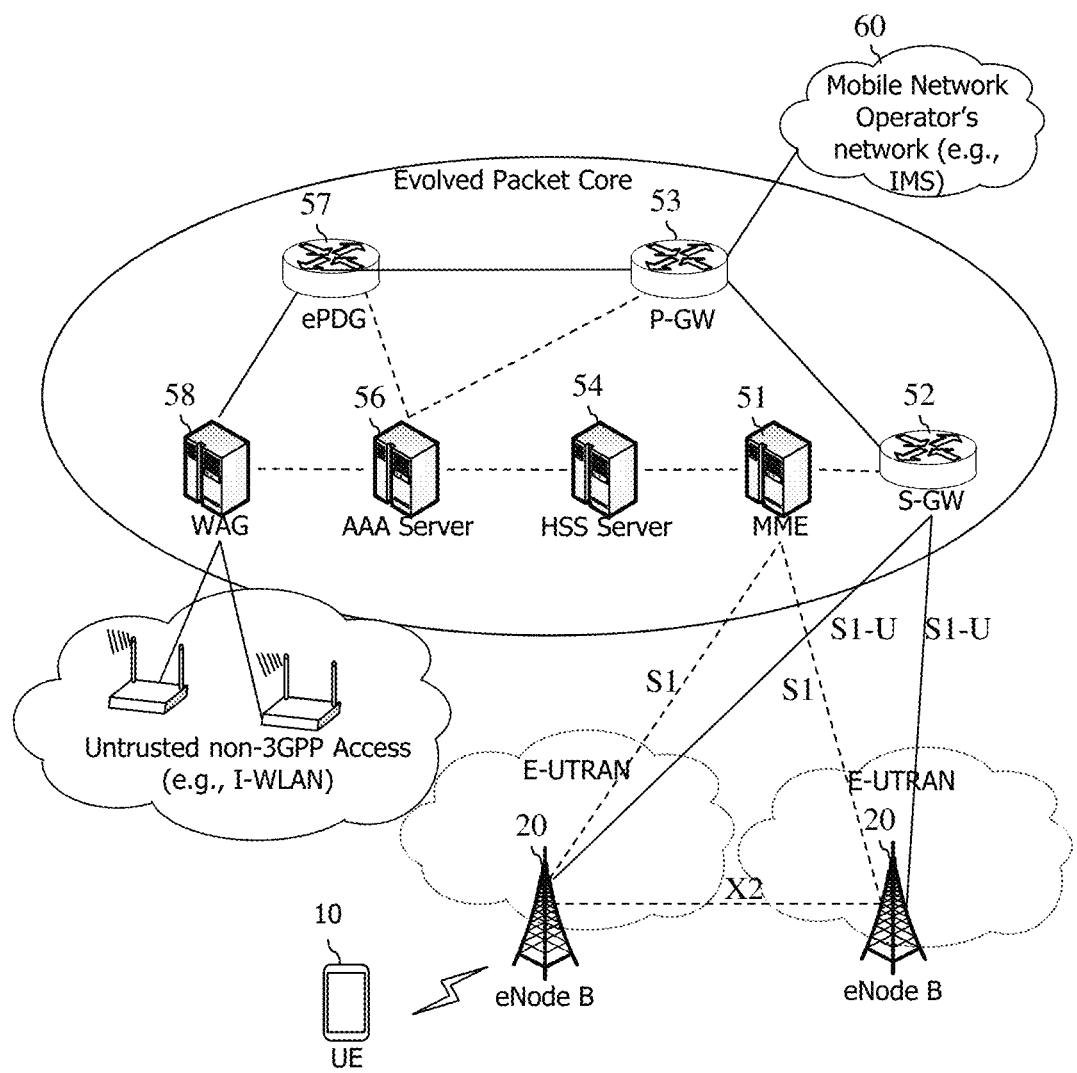
FIG. 1 is a structural diagram of an evolved mobile communication network.
Figure 2:
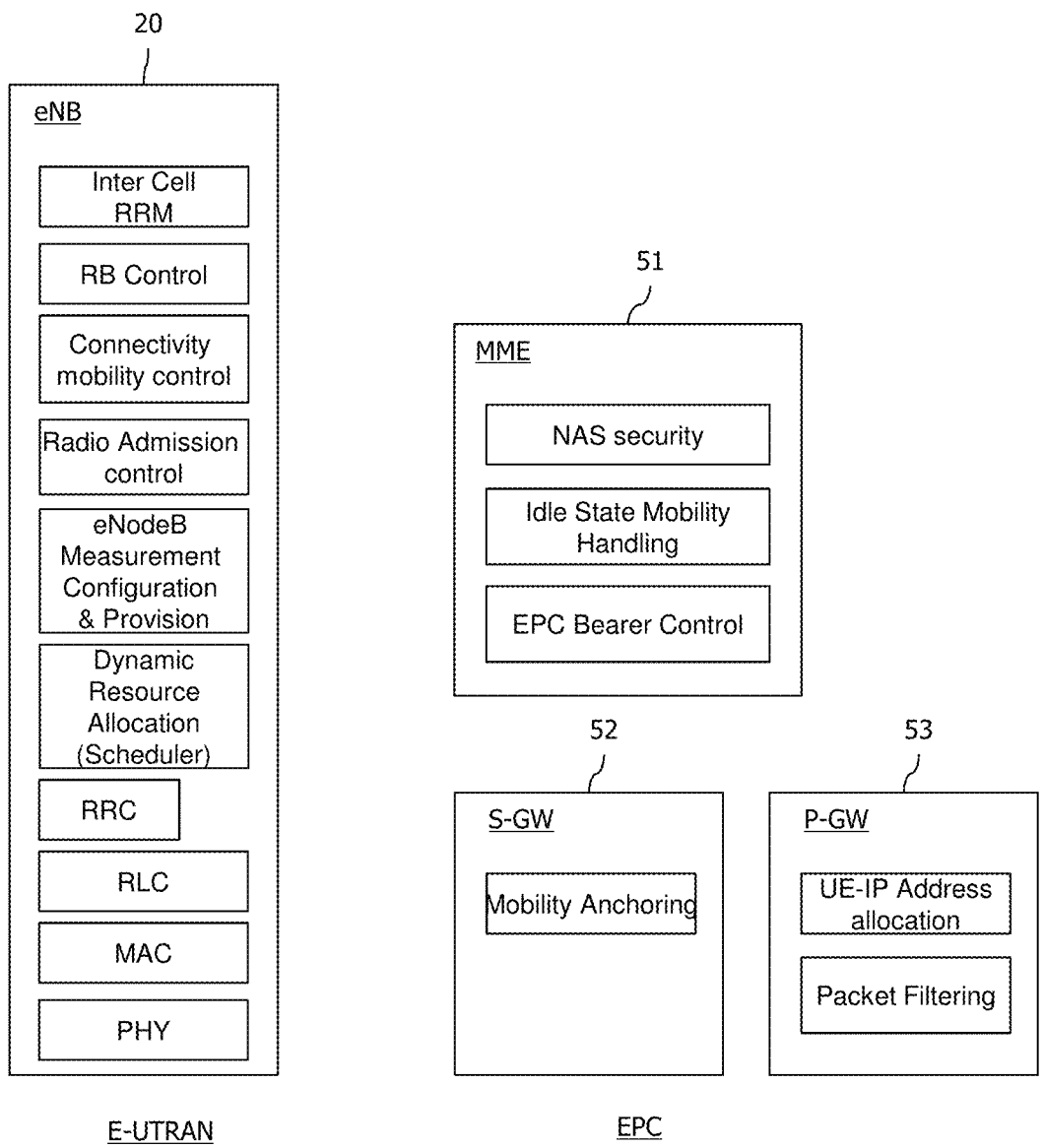
FIG. 2 is an exemplary diagram illustrating architectures of a general E-UTRAN and a general EPC.
Figure 3:
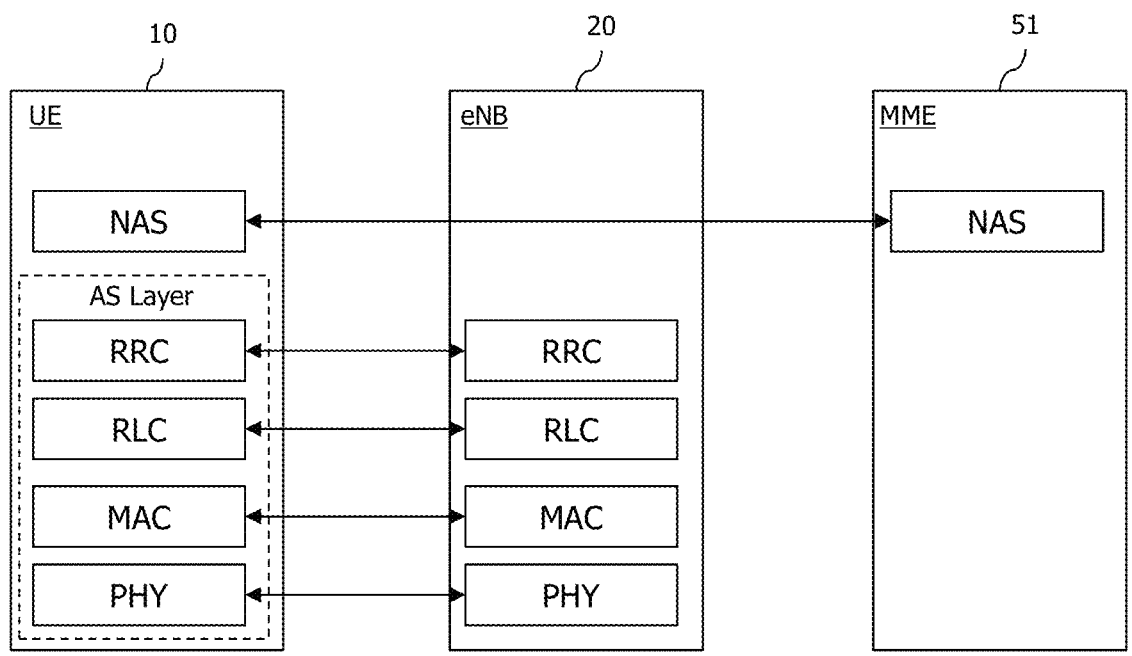
FIG. 3 is an exemplary diagram illustrating a structure of a radio interface protocol on a control plane between UE and eNodeB.
Figure 4:
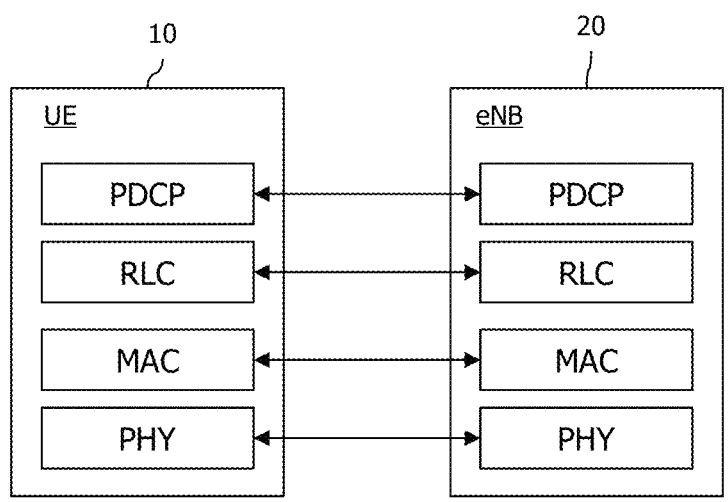
FIG. 4 is another exemplary diagram illustrating a structure of a radio interface protocol on a user plane between the UE and a base station.
Figure 5A:
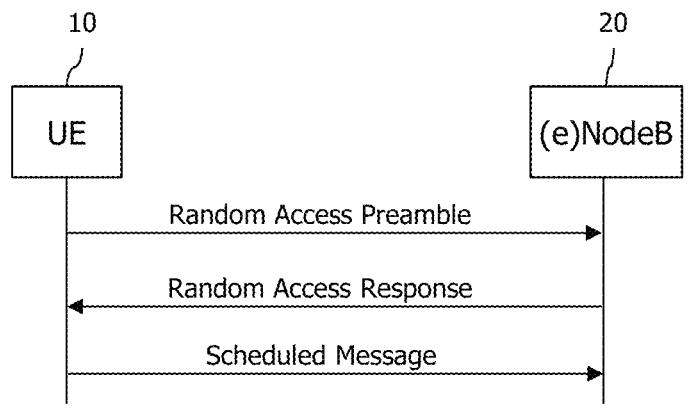
FIG. 5a is a flowchart illustrating a random access process in 3GPP LTE.
Figure 5B:
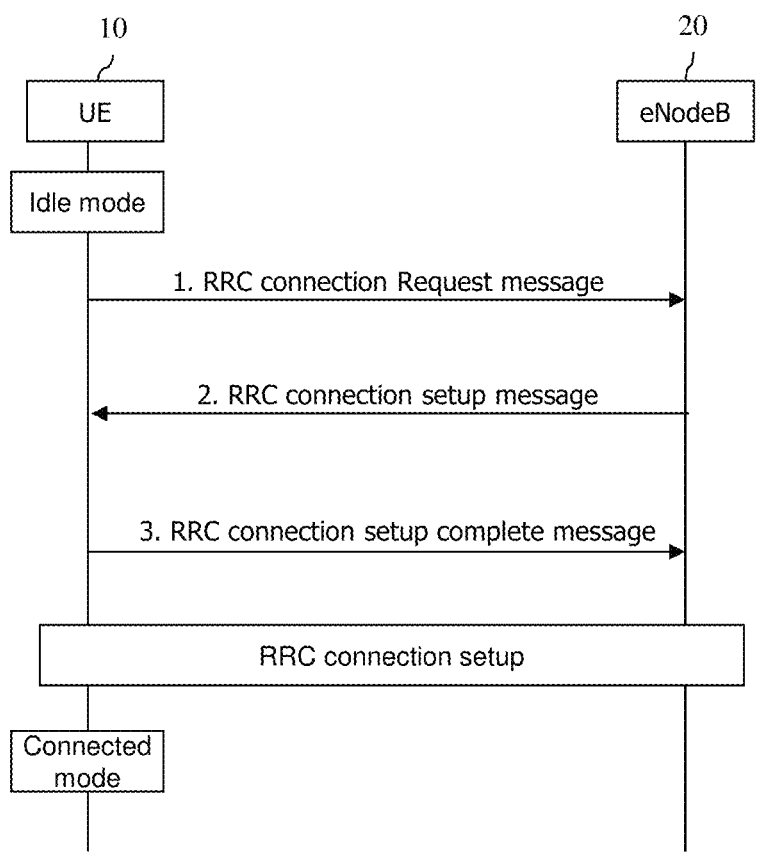
FIG. 5b illustrates a connection process in a radio resource control (RRC) layer.
Figure 6:
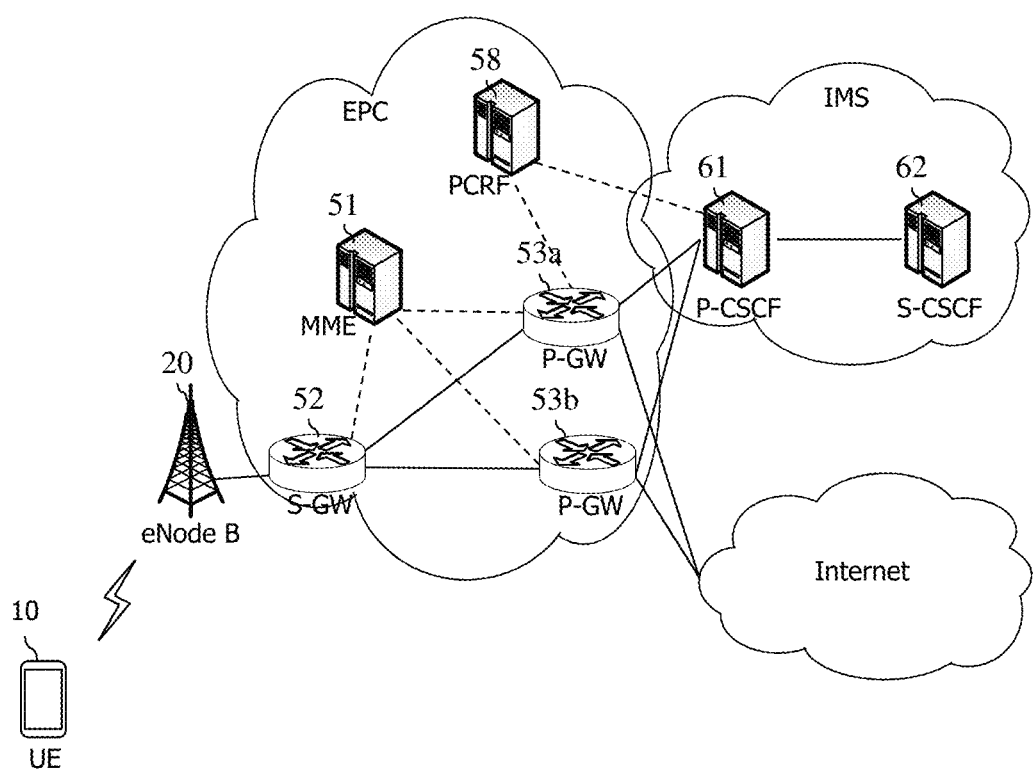
FIG. 6 illustrates connection between an EPC and an IP Multimedia Subsystem (IMS).

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

DEFINITION OF TERMS

For a better understanding, the terms used herein are briefly defined before going to the detailed description of the invention with reference to the accompanying drawings.

A GERAN is an abbreviation of a GSM EDGE Radio Access Network, and it refers to a radio access section that connects a core network and UE by GSM/EDGE.

A UTRAN is an abbreviation of a Universal Terrestrial Radio Access Network, and it refers to a radio access section that connects the core network of the 3rd generation mobile communication and UE.

An E-UTRAN is an abbreviation of an Evolved Universal Terrestrial Radio Access Network, and it refers to a radio access section that connects the core network of the 4th generation mobile communication, that is, LTE, and UE.

An UMTS is an abbreviation of a Universal Mobile Telecommunication System, and it refers to the core network of the 3rd generation mobile communication.

UE or an MS is an abbreviation of User Equipment or a Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

A Policy and Charging Rule Function (PCRF) is a node of an EPS network which performs different QoS for each service flow and a policy decision for dynamically applying a charging policy.

An Access Point Name (APN) is the name of an access point that is managed in a network and provides to UE. That is, an APN is a character string that denotes or identifies a PDN. Requested service or a network (PDN) is accessed via a P-GW. An APN is a name (character string, e.g., 'internet.mnc012.mcc345.gprs') previously defined within a network so that the P-GW can be searched for.

A Tunnel Endpoint Identifier (TEID) is an end point ID of a tunnel set up between nodes within a network and is set in each section as a bearer unit of each terminal.

A NodeB is an eNodeB of a UMTS network and installed outdoors. The cell coverage of the NodeB corresponds to a macro cell.

An eNodeB is an eNodeB of an Evolved Packet System (EPS) and is installed outdoors. The cell coverage of the eNodeB corresponds to a macro cell.

An (e)NodeB is a term that denotes a NodeB and an eNodeB.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

A Non-Access-Stratum (NAS) is a higher stratum of a control plane between UE and an MME. The NAS supports mobility management and session management between UE and a network, IP address maintenance, and so on.

RAT is an abbreviation of Radio Access Technology, and it means a GERAN, a UTRAN, or an E-UTRAN.

ANDSF (Access Network Discovery and Selection Function): This is one of network entities for providing a policy for discovering and selecting an access that can be used by a UE on an operator basis.

Meanwhile, an embodiment described below may be implemented alone, or may be implemented in combination of various embodiments.

A UE (or a terminal) assumed in the following embodiment is a terminal capable of supporting both IPv4 and IPv6, and a UE capable of supporting IPv4 and IPv6 requests for a PDN configuration of an IPv4v6 type according to the conventional technique. The network determines one of IPv4, IPv6, and IPv4v6 types according to an operator's policy and according to subscriber information, and notifies the determined type to the UE. As described in the aforementioned problem scenario, the present specification is described under the assumption that an operator configures a network such that a VoLTE service is provided basically through an IPV6 PDN, and a service is provided through an IPv4 PDN when a failure occurs in a network such as a case where a recognition is impossible between network nodes due to a failure of some or all nodes of the IPv6 PDN or, even if it is not a physical failure, a failure of a DNS which provides IP address information for recognizing each node.

I. Embodiments 1 to 3: PDN Type Change Mechanism Based on Network

The embodiments 1 to 3 described below relate to an example of a VoLTE mobile oriented (MO) call.

be provided according to the PDN connectivity request of the UE 100. When the subscriber information of the UE 100 is already present in the MME 510, an interaction with the HSS 540 may be omitted. In the present embodiment, it is assumed that information indicating that both the IPv4-based PDN connection and the IPv6-based PDN connection are possible for a corresponding APN is set in the HSS 540.

3) The MME 510 transmits a create session request message to the P-GW 530 via the S-GW 520. In this case, the MME 510 may allow the message to include a PDN type which is set based on information received from the UE 100 and subscriber information.

4) The P-GW 530 determines to establish a PDN connection for the UE 100 by using IPv6 on the basis of configuration information preset by an operator and request information received from the MME 510, and allocates an IPv6 prefix for an IP address of the UE 100.

5) The P-GW 530 transmits a create session response message to the MME 510 via the S-GW 520. In this case, the create session response message includes an allowed PDN type. The allowed PDN type may be set to IPv6. In addition, the IPv6 prefix allocated to the UE 100 and an address of a P-CSCF required for IMS registration are included in the create session response message.

The MME 510 forwards this information to the UE 100 to configure an IPv6-based PDN and a default bearer with quality of service class identifier (QCI)=5. Thereafter, the UE 100 performs an IMS registration procedure through the PDN, and is able to receive a voice service.

TABLE 2

| Entity delivering notification to UE | Detection of EPC node | Detection of IMS node |
|---|---|---|
| EPC node | Embodiment 1: It is determined to connect with IPv4 in network, and necessary setup is performed. Improvement of P-GW and MME is required. Improvement of UE is not required. | Embodiment 3: It is determined to connect with IPv4 in network, and necessary setup is performed. Notification information is delivered from IMS node to EPC node, and notification is delivered from EPC node to UE. Improvement of IMS node (e.g., P-CSCF), P-GW, and MME is required. Improvement of UE is not required. |
| IMS node | | Embodiment 2: It is determined to connect with IPv4 in network, and necessary setup is performed. Improvement of IMS node (e.g., P-CSCF) is required. Improvement of UE is not required. |

Figure 7:
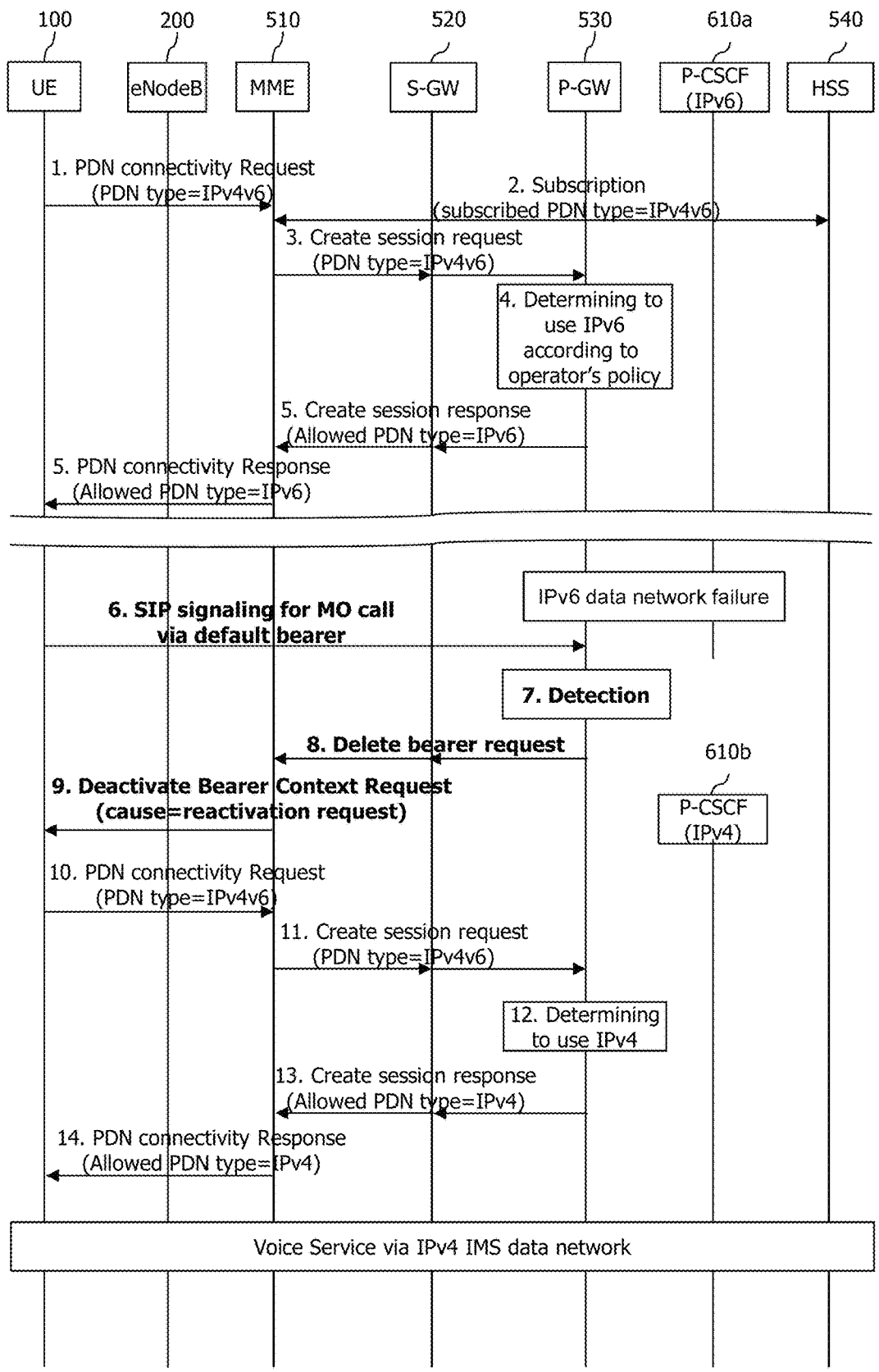
FIG. 7 illustrates an example of a signal flow according to a first embodiment.

FIG. 7 illustrates an example of a signal flow according to a first embodiment.

1) First, the UE 100 may transmit a PDN connectivity request together, when an initial attach message is transmitted to a network. Alternatively, in a state of being completely attached to the network, the UE 100 may independently transmit a PDN connectivity request message to the network when an additional PDN connection is required for another type of service. In the present embodiment, for a VoLTE service, the UE 100 transmits the PDN connectivity request message including IMS APN information and a PDN type to the MME 510. Herein, the PDN type may be set to IPv4v6. The PDN type set to IPv4 v6 indicates that the UE 100 has no problem when the PDN is connected by using any one of IPv4 and IPv6. That is, it indicates that the UE 100 can support both the IPv4 and the IPv6.

2) The MME 510 obtains subscriber information of the UE from the HSS 540, and identifies whether a service can 6) Thereafter, when a user requests for a VoLTE MO call, the UE 100 transmits a session initiation protocol (SIP)-based INVITE message. In this case, the SIP-based INVITE message is not a control signal of a control plane but data of a user plane from a perspective of an EPC network. Therefore, the SIP-based INVITE message is delivered to the P-GW 530 via the S-GW 520 without the aid of the MME 510.

7) The P-GW 530 determines whether data received from the UE 100 is normal data or IMS signaling (e.g., the SIP-based INVITE message), and thus detects the SIP-based INVITE message.

Meanwhile, according to the conventional technique, the P-GW 530 does not distinguish whether data received from the UE is normal data or IMS signaling (e.g., the SIP-based INVITE message). However, it is proposed in this section that the P-GW 530 is improved to distinguish the normal data and the IMS signaling (e.g., the SIP-based INVITE message) on the basis of the following information.

a. In case of a VoLTE service, a PDN connection which is set to a "well known" IMS APN is used. Therefore, the P-GW 530 may detect the SIP-based INVITE message by using the APN. This concept may be used to detect IMS signaling for services other than VoLTE.

b. IMS signaling is delivered using a default bearer with QCI=5. Therefore, the P-GW 530 may know whether the data received from the UE is normal data or IMS signaling (e.g., the SIP-based INVITE message) on the basis of whether the default bearer with QCI=5 is used.

A reason of detecting the reception of the IMS signaling (e.g., the SIP-based INVITE message) is to perform a method of handling a situation in which, when there is a failure in a PDN connection based on an IPv6 network, the IMS signaling cannot be delivered to the IPv6-based P-CSCF 610*a* even if the P-GW 530 receives the IMS signaling, or IMS signaling delivery is expected to fail inside the IPv6 network even if it is delivered to the IPv6-based P-CSCF 610*a*.

On the other hand, detecting the IMS signaling is not always performed by the P-GW 530, but is performed only upon recognizing that the PDN connection based on the IPv6 network has a failure.

This recognition may be performed based on a configuration changed and set by an operator. When there is a failure in the PDN connection based on the IPv6 network, the operator is expected to change and set a configuration of the P-GW 530 so that only IPv4 is possible. Therefore, the P-GW 530 may attempt to detect the SIP-based INVITE message only when it is recognized that there is a failure in the PDN connection based on the IPv6 network, on the basis of the changed and set configuration.

8) When the SIP-based INVITE message for VoLTE is received from the UE 100 but the PDN connection based on the IPv6 network has a failure, the P-GW 530 performs a P-GW initiated bearer deactivation procedure. That is, the P-GW 100 transmits a delete bearer request message to the MME 510. In this case, the P-GW 530 may allow a message to be transmitted to the MME 510 to include implicit information indicating that there is a failure in the PDN connection based on the IPv6 network.

9) The MME 510 recognizes that the PDN connection based on the IPv6 network has a failure on the basis of a management configuration set by the operator or information delivered from the P-GW, and thereafter transmits a deactivate bearer context request message to the UE 100. In this case, a 'reactivation requested' is set in a cause field in the message.

10) The UE 100 reads the cause field of the received message, releases a corresponding PDN, and thereafter transmits a PDN connectivity request message again to the MME 510. This is the same as the previous step 1).

11) The MME 510 transmits a create session request message to the P-GW 530 in the same manner as the previous step 3).

12) The P-GW 530 determines a PDN type to IPv4 on the basis of the configuration pre-set by the operator, and thereafter allocates an IPv4 address to the UE 100.

13) The P-GW 530 transmits a create session response message to the MME 510 via the S-GW 520. In this case, the create session response message includes an allowed PDN type. The allowed PDN type may be set to IPv4.

14) The MME 510 transmits the PDN connection response message to the UE in the same manner as the previous step 5).

Then, since the allowed PDN type is IPv4, the UE 100 performs IMS registration through a PDN connection based on IPv4, and thereafter receives a VoLTE service.

Figure 8:
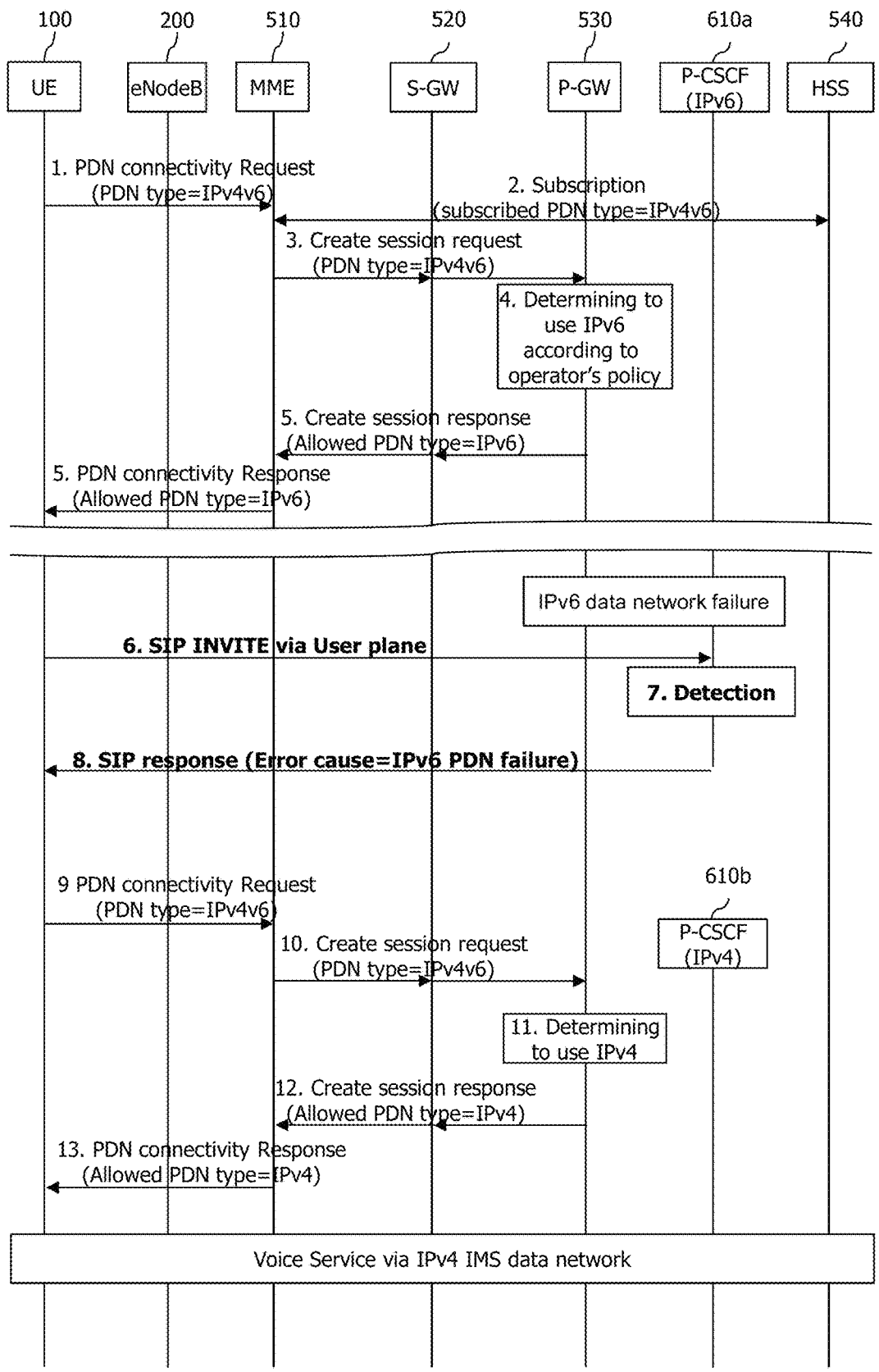
FIG. 8 illustrates an example of a signal flow according to a second embodiment.

FIG. 8 illustrates an example of a signal flow according to a second embodiment.

The steps 1) to 5) are the same as the steps 1) to 5) of FIG. 7 according to the first embodiment, thus descriptions thereof will not be repeated to avoid redundancy.

6) When a user requests for a VoLTE MO call, the UE 100 transmits a session initiation protocol (SIP)-based INVITE message. In this case, the SIP-based INVITE message is not a control signal of a control plane but data of a user plane. Therefore, the SIP-based INVITE message is delivered to the P-GW 530 without the aid of the MME 510.

Meanwhile, it is shown in FIG. 8 that the SIP-based INVITE message is delivered to the P-CSCF 610*a* since the P-GW 530 is not configured to detect the SIP-based INVITE message which is IMS signaling.

7) The IPv6-based P-CSCF 610*a* or another IMS node detects that there is a failure in the PDN connection based on the IPv6 network.

8) Then, the IMS node delivers to the UE 100 an SIP message to request the UE 100 to be reconnected to an IPv4 network. Information indicating a failure in the PDN connection based on the IPv6 network is set in the cause field in the SIP message. In this case, since the message delivered to the UE 100 is the SIP message, the message is delivered to the UE 100 through a user plane of a corresponding PDN and a default bearer with QCI=5 without the aid of the MME 510 for managing a control plane in EPC. According to the conventional technique, only when a P-CSCF or the like is intended to be changed in the same PDN, the IMS node may request the UE 100 to release an IMS registration and thereafter perform an IMS registration again. However, the present embodiment is improved such that the IMS node requests the UE 100 to release a PDN and thereafter re-establish a new PDN connection.

9) The UE 100 reads a cause field in the received SIP message. In addition, the UE recognizes that there is a failure in a PDN connection of a specific type (i.e., a PDN connection based on IPv6) on the basis of a determination result of the cause field, and thereafter transmits a PDN connectivity message again.

10-13) The process of establishing a new PDN connection is the same as the steps 11) to 14) of FIG. 7.

Figure 9:
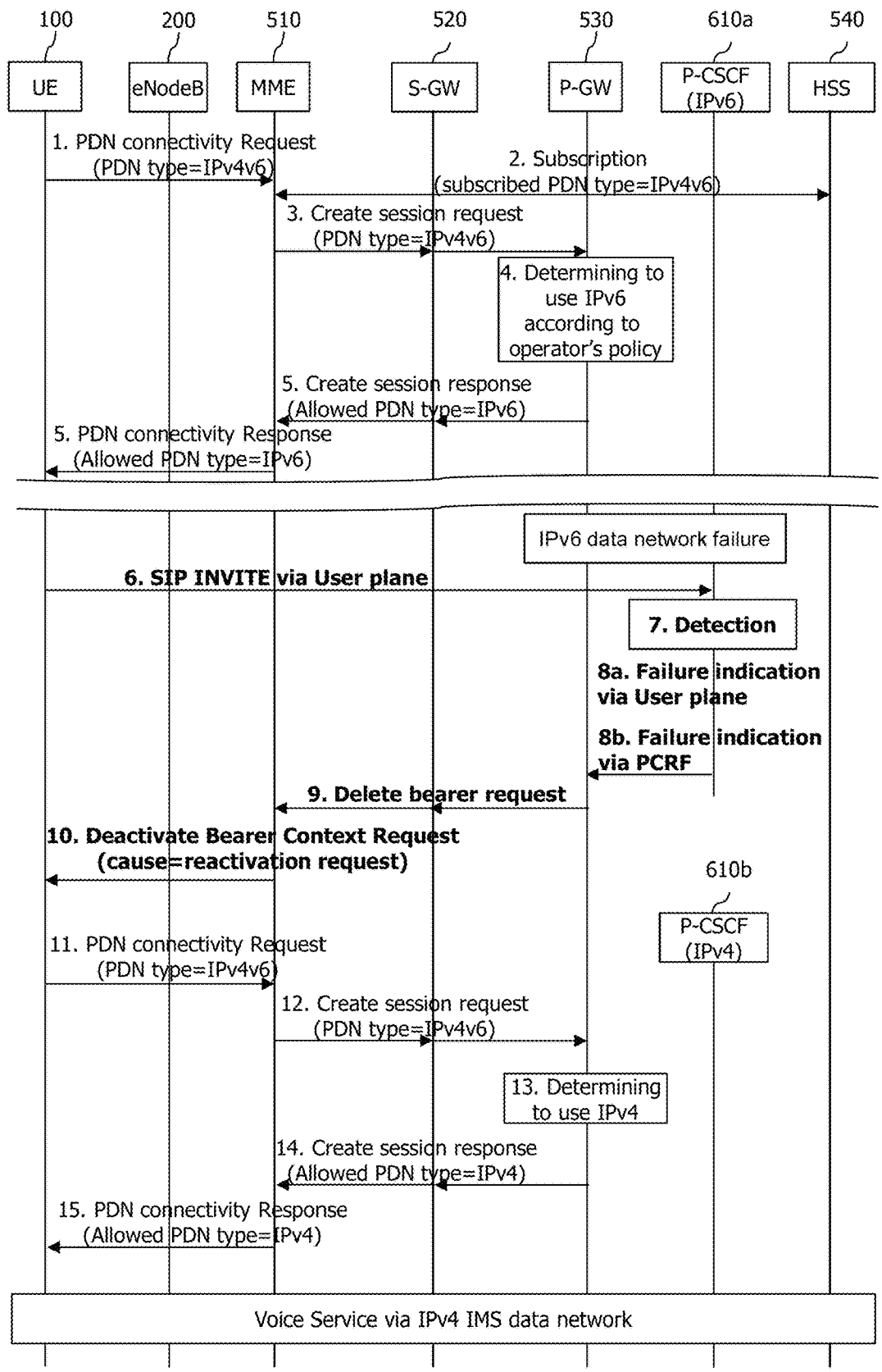
FIG. 9 illustrates an example of a signal flow according to a third embodiment.

FIG. 9 illustrates an example of a signal flow according to a third embodiment.

The steps 1) to 7) are the same as the steps 1) to 7) of FIG. 8 according to the second embodiment, thus descriptions thereof will not be repeated to avoid redundancy.

8) When the IPv6-based P-CSCF 610*a* recognizes that there is a failure in a PDN connection based on an IPv6 network, the IPv6-based P-CSCF 610*a* delivers information regarding the failure of the PDN connection based on the IPv6 network to the P-GW 530 by using one of the following options. In addition to a fact that the failure simply occurs, information for requesting the P-GW 530 in EPC to establish a new PDN connection may be implicitly/directly included.

Option 1: The P-CSCF 610 transmits a dummy packet to the P-GW 530 via a user plane of a corresponding PDN. That is, although signaling for an MT call is not received, the P-CSCF 610 notifies the P-GW 530 of the failure in a direction in which the signaling for the MT call is delivered.

Option 2: Since a PCRF, i.e., a network for managing an operator policy, is present between the P-CSCF 610 and the P-GW 530, the P-CSCF 610 notifies the P-GW 530 of the failure of the PDN via the PCRF.

9) When the P-GW 530 recognizes that there is a failure in the PDN connection based on the IPv6 network on the basis of information received from the P-CSCF 610, a delete bearer request message is transmitted to the MME 510 to perform a P-GW initiated bear deactivation procedure.

10) The MME 510 recognizes that the PDN connection based on the IPv6 network has a failure, on the basis of a management configuration set by the operator or information delivered from the P-GW, and thereafter transmits a deactivate bearer context request message to the UE 100. In this case, a 'reactivation requested' is set in a cause field in the message.

11-15) This is the same as the previous steps 10) to 14) of FIG. 7 according to the first embodiment.

II. Embodiments 4 to 6: PDN Type Change Mechanism Based on UE

The embodiments 4 to 6 described below are for a VoLTE MO call scenario.

8) The P-GW 530 allows the IPv4-based P-CSCF address to be included in a PCO field in an update bearer request message, and delivers it to the MME 510 via the S-GW 520.

9) The MME 510 forwards the update bearer request message including the IPv4-based P-CSCF address to the UE 100.

10) Upon receiving the update bearer request message instead of a response message for the SIP-based message, the UE 100 recognizes that there is a failure in a PDN connection of a specific type (i.e., a PDN connection based on IPv6) on the basis of the update bearer request message. Specifically, upon reading that a P-CSCF address included in a PCO field in the update bearer request message corresponds only to IPv4, the UE 100 may recognize that there is a failure in the PDN connection of the specific type (i.e., the PDN connection based on IPv6). Alternatively, the UE 100 may recognize that there is a failure in the PDN connection of the specific type (i.e., the PDN connection based on IPv6) by a combination of different pieces of information other than the IPv4-based P-CSCF address.

TABLE 3

| Entity delivering notification to UE | Detection of EPC node | Detection of IMS node |
|---|---|---|
| EPC node | Embodiment 4: IPv6 network failure is detected in network, and thereafter information (IPv4 P-CSCF address, etc.) is sent to UE 100. Based on received information, UE 100 performs active operation (recognizing IPv6 network failure, determining to change PDN type, performing detach/reattach, in particular, requesting for IPv4 PDN) Improvement of P-GW 530 is required. Improvement of UE 100 is not required. | Embodiment 6: IMS node notifies EPC node of network failure, EPC node notifies UE 100 of network failure. After recognizing IPv6 network failure, network transmits information (IPv4 P-CSCF address, etc.) to UE 100. Based on received information, UE 100 performs active operation (recognizing IPv6 network failure, determining to change PDN type, performing detach/reattach, in particular, requesting for IPv4 PDN) Improvement of IMS node (e.g., P-CSCF), P-GW 530, and MME 510 is required. Improvement of UE 100 is not required. |
| IMS node | | Embodiment 5: After recognizing IPv6 network failure in network, failure is notified and information is transmitted to UE 100. Based on received information, UE 100 performs active operation (recognizing IPv6 network failure, determining to change PDN type, performing detach/reattach, in particular, requesting for IPv4 PDN) Improvement of IMS node (e.g., P-CSCF) is required. Improvement of UE 100 is not required. |

Figure 10:
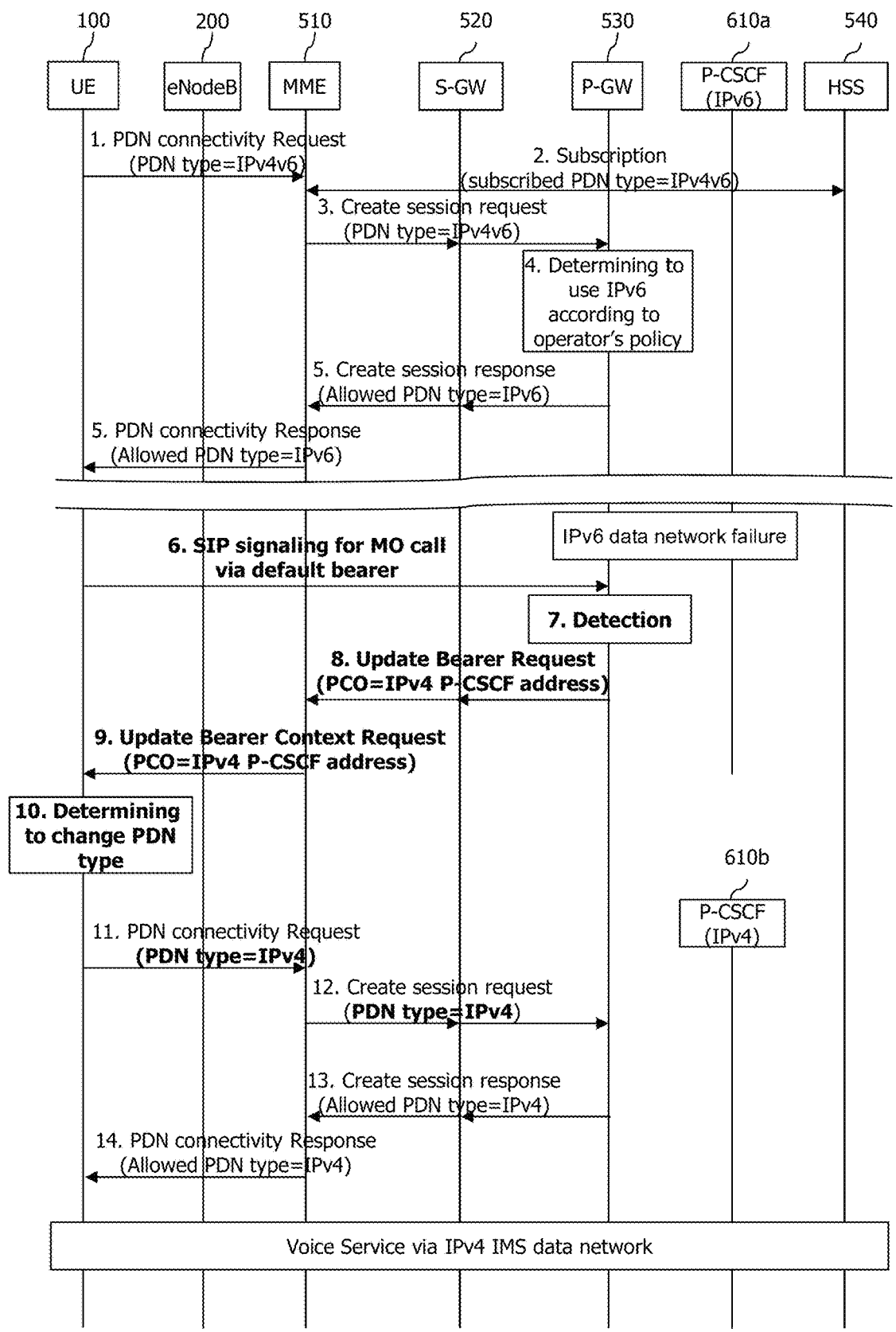
FIG. 10 illustrates an example of a signal flow according to a fourth embodiment.

FIG. 10 illustrates an example of a signal flow according to a fourth embodiment.

The steps 1) to 6) are the same as the steps 1) to 6) of FIG. 7 according to the first embodiment, thus descriptions thereof will not be repeated to avoid redundancy.

7) In the same manner as the step 7) of FIG. 7 according to the first embodiment, the P-GW 530 detects a situation, and thereafter provides the UE 100 with indirect information other than a direct indication. For example, since an IPv6-based P-CSCF address previously allocated/delivered to the UE 100 cannot be used due to a failure of the PDN connection based on the IPv6 network, the P-GW 530 determines an IPv4-based P-CSCF address list.

Then, the UE 100 determines to establish the IPv4-based PDN connection.

11) After releasing the IPv6-based PDN connection, the UE 100 transmits a PDN connectivity request message to establish the IPv4-based PDN connection. In the conventional technique, the UE 100 must perform transmission by setting the PDN type to IPv4v6 when both IPv4 and IPv6 can be supported. However, it is improved in the present embodiment that the PDN type is set to IPv4 by an active determination and operation of the UE 100.

Figure 11:
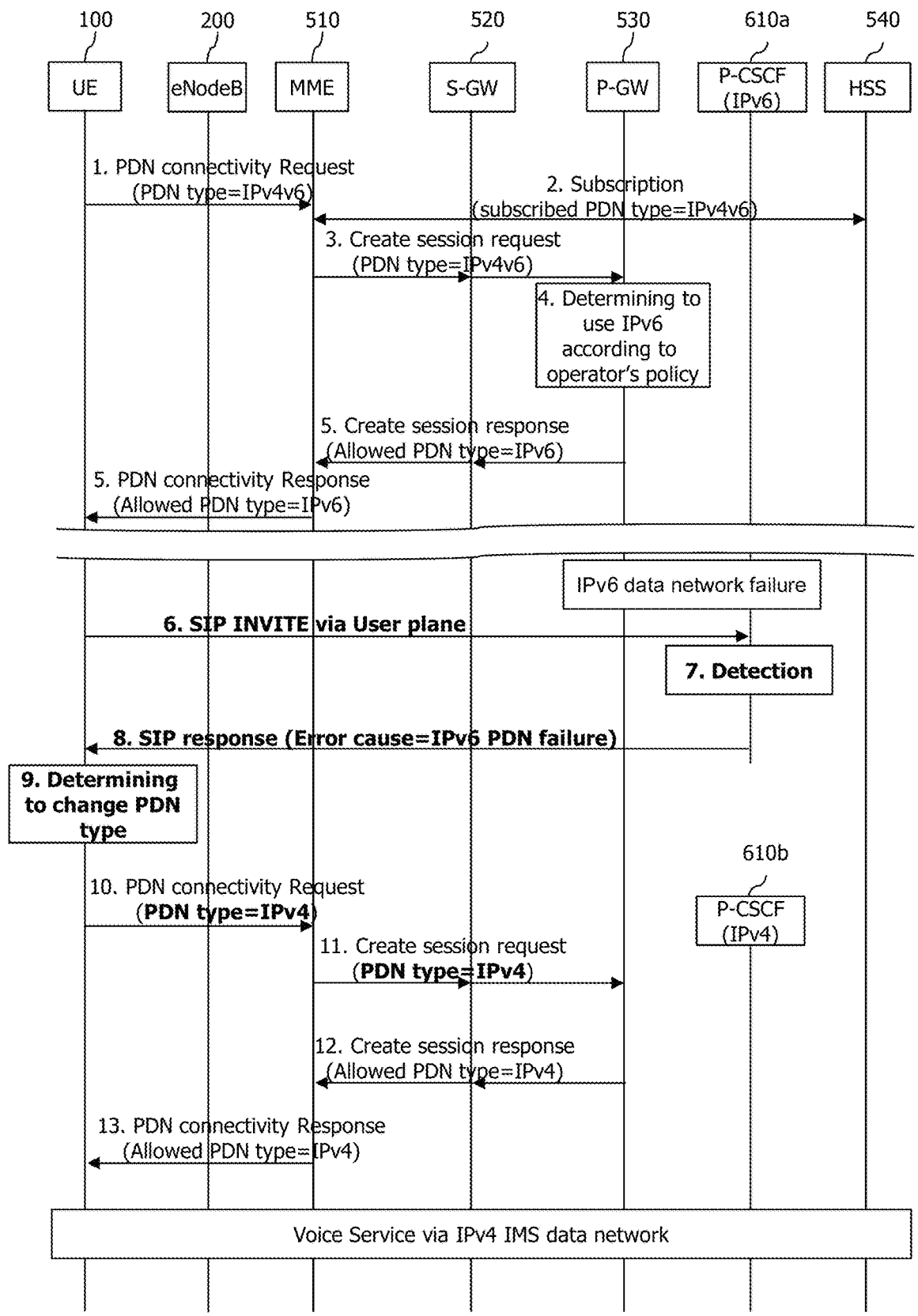
FIG. 11 illustrates an example of a signal flow according to a fifth embodiment.

FIG. 11 illustrates an example of a signal flow according to a fifth embodiment.

The steps 1) to 7) are the same as the steps 1) to 7) of FIG. 8 according to the second embodiment, thus descriptions thereof will not be repeated to avoid redundancy.

8) Then, the IMS node delivers to the UE 100 an SIP message to request the UE 100 to be reconnected to an IPv4 network. Information indicating a failure in the PDN connection based on the IPv6 network is set in the cause field in the SIP message.

9) When the UE 100 receives an SIP message including a cause field indicating a failure of the PDN connection based on the IPv6 network instead of a normal response message for the SIP-based message, the UE 100 recognizes that there is a failure in a PDN connection of a specific type (i.e., a PDN connection based on IPv6) on the basis of the cause field. In addition, the UE 100 determines to re-establish the PDN connection based on IPv4.

10) After releasing the IPv6-based PDN connection, the UE 100 transmits a PDN connectivity request message to establish the IPv4-based PDN connection. In the conventional technique, the UE 100 must perform transmission by setting the PDN type to IPv4v6 when both IPv4 and IPv6 can be supported. However, it is improved in the present embodiment that the PDN type is set to IPv4 by an active determination and operation of the UE 100.

Figure 12:
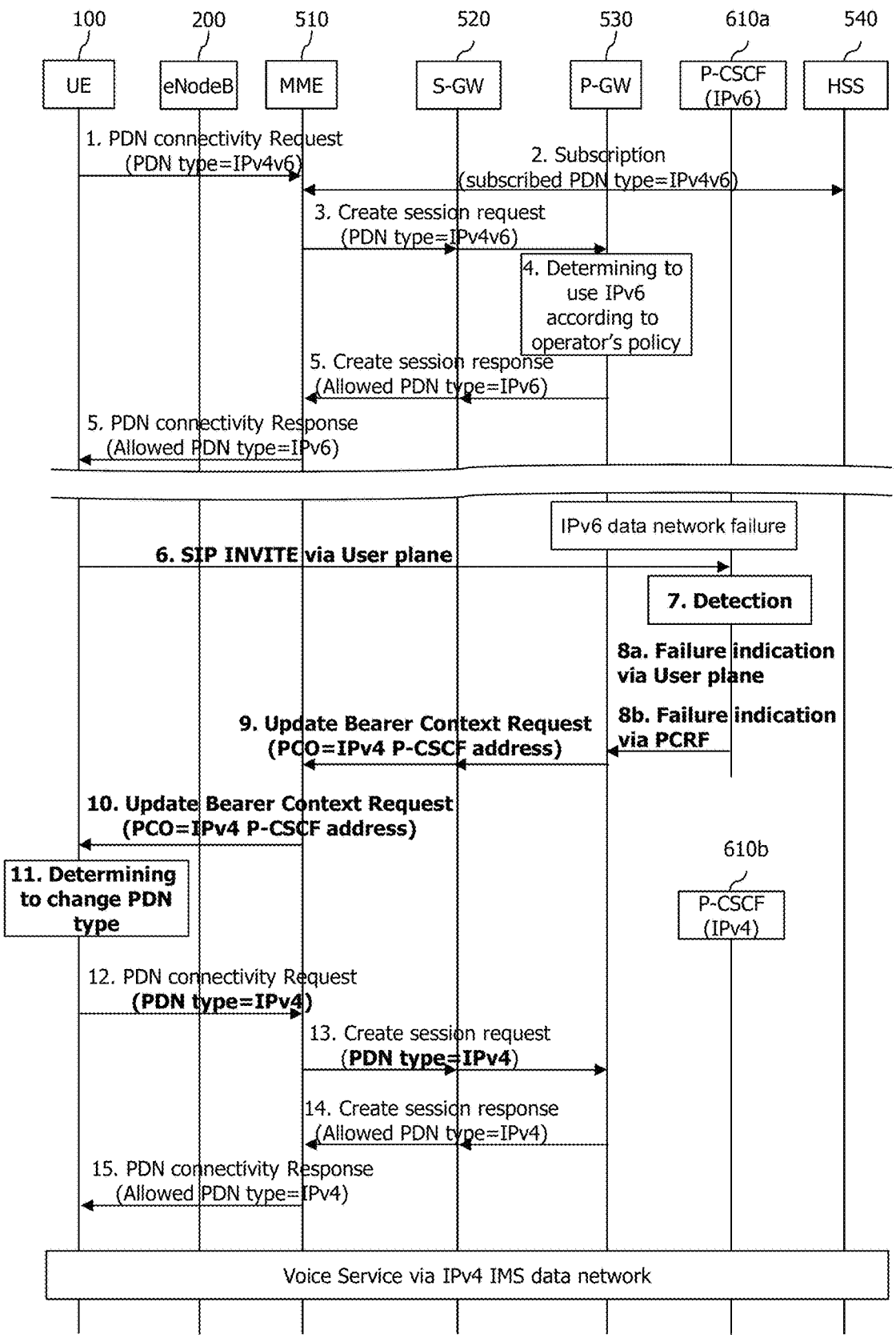
FIG. 12 illustrates an example of a signal flow according to a sixth embodiment.

FIG. 12 illustrates an example of a signal flow according to a sixth embodiment.

The steps 1) to 8) are the same as the steps 1) to 8) of FIG. 9 according to the third embodiment, thus descriptions thereof will not be repeated to avoid redundancy.

9) Upon recognizing a failure of the PDN connection based on the IPv6 network, the P-GW 530 allows the IPv4-based P-CSCF address to be included in a PCO field in an update bearer request message, and delivers it to the MME 510 via the S-GW 520.

10) The MME 510 forwards the update bearer request message to the UE 100.

11) Upon receiving the update bearer request message instead of a response message for the SIP-based message, the UE 100 recognizes that there is a failure in a PDN connection of a specific type (i.e., a PDN connection based on IPv6) on the basis of the update bearer request message. Specifically, upon reading that a P-CSCF address included in a PCO field in the update bearer request message corresponds only to IPv4, the UE 100 may recognize that there is a failure in the PDN connection of the specific type (i.e., the PDN connection based on IPv6). Alternatively, the UE 100 may recognize that there is a failure in the PDN connection of the specific type (i.e., the PDN connection based on IPv6) by a combination of different pieces of information other than the IPv4-based P-CSCF address.

Then, the UE 100 determines to establish the IPv4-based PDN connection.

12) After releasing the IPv6-based PDN connection, the UE 100 transmits a PDN connectivity request message to establish the IPv4-based PDN connection. In the conventional technique, the UE 100 must perform transmission by setting the PDN type to IPv4v6 when both IPv4 and IPv6 can be supported. However, it is improved in the present embodiment that the PDN type is set to IPv4 by an active determination and operation of the UE 100.

III. Embodiment 7: PDN Type Change Mechanism Based on MME 510

The embodiment 7 described below is for a VoLTE MT call scenario.

Since an MT call starts after an SIP message is received from an IMS node, it cannot be detected by an EPC node.

In addition, even if it is detected by the IMS node, since there is a failure in a current IMS network, the IMS node cannot notify a UE of a failure.

TABLE 4

| Entity delivering notification to UE | Detection of EPC node | Detection of IMS node |
| --- | --- | --- |
| EPC node | | Embodiment 7: It is detected by MME 510 according to capability of UE 100/network<br>Option 1 (passive option): Detach/re-attach is simply requested to UE<br>Option 2 (active option): MME requests P-GW 530 to generate new P-CSCF address list<br>Option 3: Logical PDN context of UE/network is modified, IPv4 network connection is re-established only through IMS re-registration<br>Improvement of HSS 540, MME 510, and P-GW 530 is required. |

Figure 13:
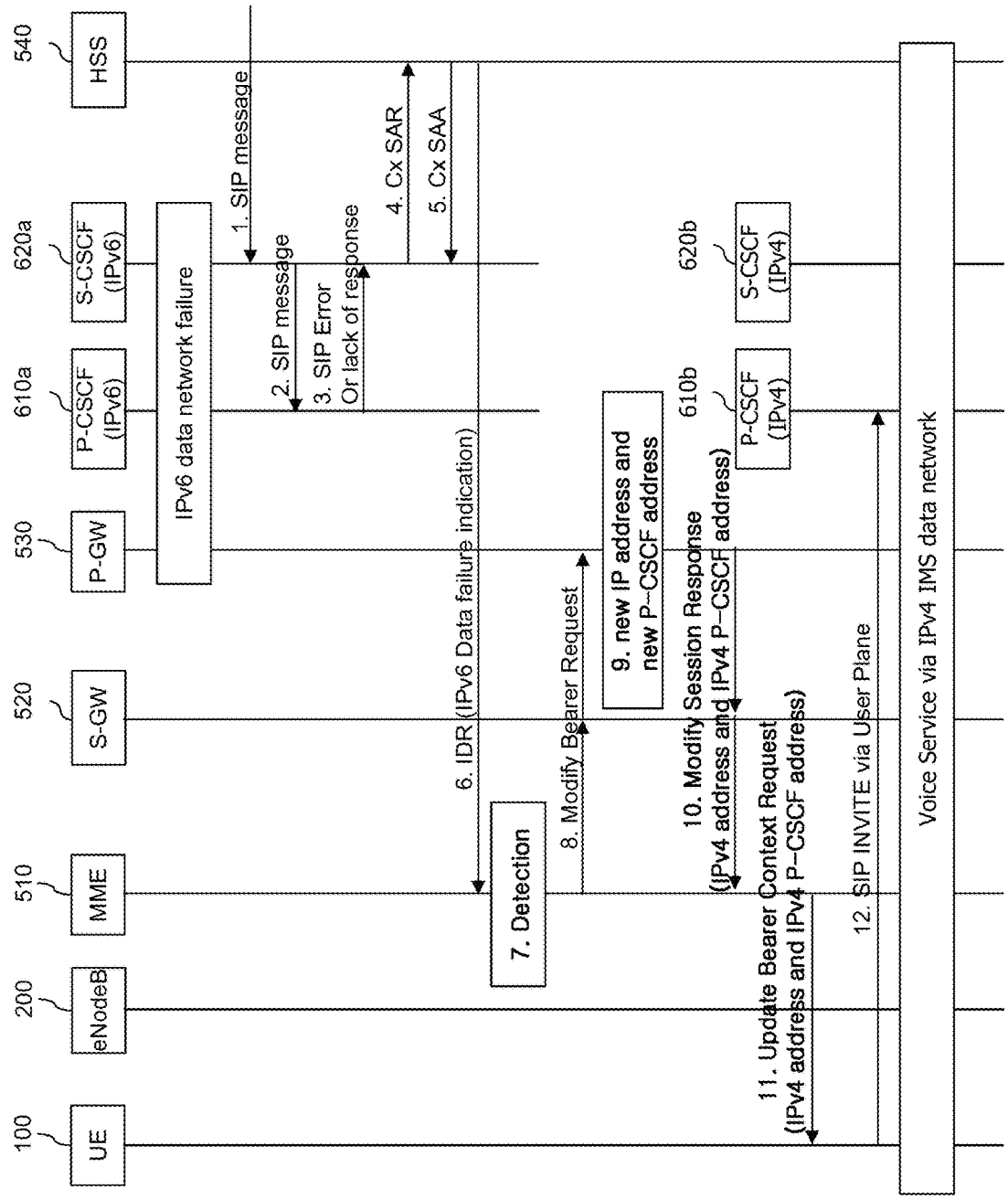
FIG. 13 illustrates an example of a signal flow according to a seventh embodiment.

FIG. 13 illustrates an example of a signal flow according to a seventh embodiment.

1)-2) An SIP message requesting for an MT call arrives at an IPv6 network node.

3)-5) After recognizing a failure in the IMS node, the IMS node delivers an indicator regarding the failure to the HSS 540.

6) The HSS 540 determines that there is a failure in the PDN connection based on the IPv6 network on the basis of configuration information of an operator and the indication received from the IMS node. In addition, the HSS 540 delivers a failure situation of the PDN connection based on the IPv6 network to the MME 510.

7) After receiving information regarding the failure situation of the PDN connection based on the IPv6 network from the HSS 540, the MME 510 selects any one of several options regarding the change of the PDN type. Specifically, the MME 510 may select one of the following several options according to a capability of the UE 100, capability of a network, and a policy of an operator.

Option 1 (passive option): The MME 510 may instruct to detach from or reattach to the UE 100, so that a new PDN is configured.

Option 2 (active option): The MME 510 transmits a message for requesting the P-GW 530 to newly generate an address list of an IPv4-based P-CSCF, so that the UE 100 can perform an active operation.

Option 3: Since the PDN is a defined in regards to a logical relation between the UE 100 and the network, the PDN type is changed without having to use a detach/reattach process by updating information required for the PDN configuration. That is, the EPC node updates only information related to PDN context, and the UE 100 performs an IMS registration through a new type of PDN.

8) When the option 3 is selected, the MME 510 transmits a modify bearer request message to request the P-GW 530 to newly allocate an IP address of the UE 100 on the basis of IPv4 and to newly generate an address of an IPv4-based P-CSCF.

9) The P-GW 530 generates and delivers an IPv4-based address allocated to the UE and an address list of the IPv4-based P-CSCF at the request of the MME 510. For this, a modify session request message may be used. In this case, the P-GW 530 updates PDN context in the presence of other necessary information so that a new type of PDN connection can be established, and delivers the modify session response message to the MME 510 by including the updated PDN context thereto.

10) The MME 510 updates PDN context information received from the P-GW 530. In addition, the MME 510 transmits to an update bearer context request message including an IPv4 address allocated to the UE and an address list of the IPv4-based P-CSCF.

11) The UE 100 updates PDN context information thereof on the basis of information received from the P-GW 530 via the MME 510.

12) The UE 100 performs an IMS registration process for receiving a VoLTE MT call through a new PDN connection by using a newly allocated IPv4 address and IPv4-based P-CSCF address.

Although the aforementioned embodiment has been described on the basis of EPS, it is also applicable to a next generation network system (or a next generation system) or other networks which are studied in 3GPP Rel-14. For example, when it is intended to change a connection configuration from any one logical/physical service domain of a network to another logical/physical domain, if the change is attempted sequentially since there are a large number of terminals accessed to a specific logical/physical service domain, a service may be continuously requested in the meantime. In this case, a service request and data transmission are recognized based on specific APN information or unique characteristic information for signaling on a specific logical/physical service domain (e.g., a characteristic in which IMS signaling is transmitted through QCI=5 default bearer of the above embodiment), and thereafter a connection configuration of the UE is first processed to minimize a service interruption time or (if the connection configuration is changed due to a management/operation of an operator other than a failure situation) to allow a changed service to be first provided.

The content described up to now can be implemented in hardware. This will be described with reference to FIG. 14.

Figure 14:
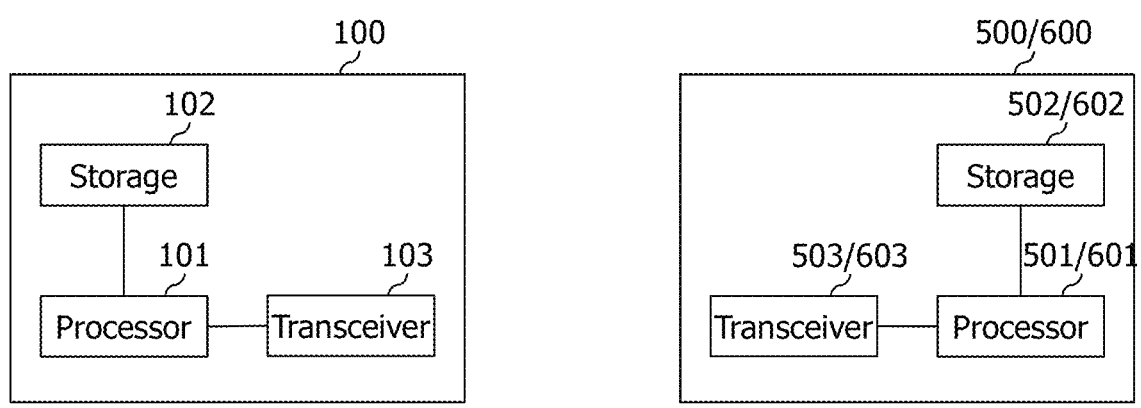
FIG. 14 is a block diagram of a UE 100 and a network node according to an embodiment of the present invention.

FIG. 14 is a block diagram of a UE 100 and a network node according to an embodiment of the present invention.

As shown in FIG. 18, the UE 100 includes a storing unit 101, a controller 102, and a transceiver 103. Further, the network node 500/600 may be the MME 510, the P-GW 530, or the P-CSCF 610. The network node 500/600 includes a storing unit 501/601, a controller 502/602, and a transceiver 503/603.

The storing units store the aforementioned method.

The controllers control the storing units and the transceivers. More specifically, the controllers respectively execute the methods stored in the storing units. Further, the controllers transmit the aforementioned signals via the transceivers.

Although exemplary embodiments of the present invention have been described above, the scope of the present invention is not limited to the specific embodiments and the present invention may be modified, changed, or improved in various ways within the scope of the present invention and the category of the claims.

What is claimed is:

1. A method for managing a packet data network (PDN) connection, the method performed by a packet data network gateway (P-GW) and comprising:

establishing, by the P-GW, a first-type PDN connection with a user equipment; (UE), wherein the first-type PDN connection is established based on internet protocol (IP) version six (6) and is established with an IP multimedia subsystem (IMS);

after establishing the first-type PDN connection, receiving, by the P-GW, dummy data from a proxy-call session control function (P-CSCF) in the IMS, recognizing, by the P-GW, that a failure occurred in the first-type PDN connection of the IP version six (6) with the IMS, based on the dummy data;

determining, by the P-GW, whether normal data is received through the first-type PDN connection or IMS signaling is received through the first-type PDN connection; and transmitting, by the P-GW, a delete bearer request message to a mobility management entity (MME) to perform a bearer deactivation procedure, based on (i) the recognition of the failure that occurred in the first-type PDN connection of IP version six (6) and (ii) that the IMS signaling is received through the first-type PDN connection of IP version six (6), wherein the delete bearer request message comprises information representing the occurrence of the failure in the first-type PDN connection of IP version six (6).

2. The method of claim 1, wherein the recognition of a failure is based on a configuration, changed and set by an operator.

3. The method of claim 1, wherein determining whether the normal data is received or the IMS signaling is received is performed based on a specific access point name (APN) and a quality of service class identifier (QCI) of a default bearer.

4. The method of claim 1, further comprising:

receiving information representing the occurrence of the failure in the first-type PDN connection from a P-CSCF via a policy and a charging rule function (PCRF), wherein the recognition of the failure is based on a reception of the information.

5. A management method performed by an entity in charge of a control plane in an evolved packet system (EPS), the method comprising:

receiving information representing an occurrence of a failure in a first-type network;

detecting the occurrence of the failure in the first-type network based on the information;

transmitting a modify bearer request message to a PDN-gateway (P-GW) which has established a packet data network (PDN) connection with a user equipment (UE), based on the occurrence of the failure in the first-type network, wherein the first-type PDN connection is established based on internet protocol (IP) version six (6) and is established via the first-type network with an IP multimedia subsystem (IMS);

receiving a modify bearer response message, based on (i) the the detection of the failure and (ii) that IMS signaling needs to be transceived in the first-type network, wherein the response message, from the P-GW, includes address information of a second-type network; and transmitting the address information of the second-type network to the UE.

6. The method of claim 5, wherein the modify bearer response message comprises updated PDN context information.

7. The method of claim 5, wherein the address information of the second-type network comprises a second-type address allocated for the UE and a second-type address of a P-CSCF.

* * * * *